(12) United States Patent
Jeong et al.

(10) Patent No.: US 10,236,533 B2
(45) Date of Patent: Mar. 19, 2019

(54) ELECTRODE ASSEMBLY HAVING SEPARATOR EXHIBITING HIGH ELONGATION PROPERTY AND SECONDARY BATTERY INCLUDING THE SAME

(71) Applicant: LG CHEM, LTD., Seoul (KR)

(72) Inventors: Yu Na Jeong, Daejeon (KR); Moon Young Jung, Daejeon (KR); Dong-Myung Kim, Daejeon (KR); Ki Tae Kim, Daejeon (KR); Sungwon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 152 days.

(21) Appl. No.: 15/101,558

(22) PCT Filed: Jan. 9, 2015

(86) PCT No.: PCT/KR2015/000216
§ 371 (c)(1),
(2) Date: Jun. 3, 2016

(87) PCT Pub. No.: WO2015/105365
PCT Pub. Date: Jul. 16, 2015

(65) Prior Publication Data
US 2016/0308250 A1 Oct. 20, 2016

(30) Foreign Application Priority Data
Jan. 10, 2014 (KR) .................. 10-2014-0003140
Jan. 10, 2014 (KR) .................. 10-2014-0003146

(51) Int. Cl.
*H01M 6/46* (2006.01)
*H01M 2/14* (2006.01)
(Continued)

(52) U.S. Cl.
CPC ....... *H01M 10/0583* (2013.01); *H01M 2/022* (2013.01); *H01M 2/0207* (2013.01);
(Continued)

(58) Field of Classification Search
USPC .................. 429/129, 131, 142, 152, 163
See application file for complete search history.

(56) References Cited

U.S. PATENT DOCUMENTS

| 7,709,152 | B2 * | 5/2010 | Kim | ............ | H01M 2/145 |
|---|---|---|---|---|---|
| | | | | | 429/231.95 |
| 2002/0160257 | A1 * | 10/2002 | Lee | ............ | H01M 6/46 |
| | | | | | 429/130 |

(Continued)

FOREIGN PATENT DOCUMENTS

| JP | 2000-21386 A | 1/2000 |
|---|---|---|
| JP | 2002-151159 A | 5/2002 |

(Continued)

OTHER PUBLICATIONS

International Search Report (PCT/ISA/210) issued in PCT/KR2015/000216, dated Apr. 20, 2015.
(Continued)

*Primary Examiner* — Cynthia H Kelly
*Assistant Examiner* — Julian Anthony
(74) *Attorney, Agent, or Firm* — Mintz Levin Cohn Ferris Glovsky and Popeo, P.C.; Kongsik Kim (57) ABSTRACT

Disclosed herein is a stacked/folded type electrode assembly configured to have a structure in which two or more unit cells, each of which includes a separator disposed between a positive electrode and a negative electrode, each having an electrode mixture including an electrode active material applied to a current collector, are wound using a sheet type separation film, wherein the positive electrode is configured to have a structure in which a positive electrode mixture is (Continued)

coated on an aluminum foil as the current collector and the negative electrode is configured to have a structure in which a negative electrode mixture is coated on a metal foil, other than the aluminum foil, as the current collector, the unit cells include one or more full-cells and/or bi-cells, one of the unit cells located at each outermost side of the electrode assembly is configured such that one outermost electrode of the unit cell is a single-sided electrode, the single-sided electrode being configured such that the electrode mixture is applied only to one major surface of the current collector facing the separator, and the separation film has higher elongation than the separator.

24 Claims, 8 Drawing Sheets (51) Int. Cl.

| | | |
|---|---|---|
| *H01M 2/16* | (2006.01) | |
| *H01M 2/18* | (2006.01) | |
| *H01M 2/00* | (2006.01) | |
| *H01M 10/0583* | (2010.01) | |
| *H01M 4/66* | (2006.01) | |
| *H01M 10/04* | (2006.01) | |
| *H01M 2/02* | (2006.01) | |
| *H01M 10/0525* | (2010.01) | |
| *H01M 10/052* | (2010.01) | |
| *H01M 10/42* | (2006.01) | |
| *H01M 4/02* | (2006.01) | |

(52) U.S. Cl.
CPC ........... *H01M 2/166* (2013.01); *H01M 2/168* (2013.01); *H01M 2/1653* (2013.01); *H01M 2/1686* (2013.01); *H01M 4/661* (2013.01); *H01M 10/0459* (2013.01); *H01M 10/052* (2013.01); *H01M 10/0525* (2013.01); *H01M 10/4235* (2013.01); *H01M 2004/027* (2013.01); *H01M 2004/028* (2013.01); *H01M 2220/30* (2013.01)

(56) References Cited

U.S. PATENT DOCUMENTS

| | | | |
|---|---|---|---|
| 2005/0266292 A1* | 12/2005 | Kim | H01M 2/1646 429/141 |
| 2013/0011715 A1 | 1/2013 | Lee et al. | |
| 2013/0330586 A1 | 12/2013 | Yun | |
| 2015/0024245 A1 | 1/2015 | Kwon et al. | |
| 2015/0311491 A1* | 10/2015 | Deschamps | H01M 2/1653 429/152 |

FOREIGN PATENT DOCUMENTS

| | | |
|---|---|---|
| JP | 2009-505366 A | 2/2009 |
| JP | 2013-524460 A | 6/2013 |
| JP | 2014-524112 A | 9/2014 |
| JP | 2015-513195 A | 4/2015 |
| KR | 2003-0033491 A | 5/2003 |
| KR | 10-2005-0066652 A | 6/2005 |
| KR | 10-2007-0041920 A | 4/2007 |
| KR | 10-2008-0009349 A | 1/2008 |
| KR | 10-2013-0124922 A | 11/2013 |

OTHER PUBLICATIONS

Extended European Search Report dated Jul. 18, 2017 for Application No. 15735438.2.

* cited by examiner

ELECTRODE ASSEMBLY HAVING SEPARATOR EXHIBITING HIGH ELONGATION PROPERTY AND SECONDARY BATTERY INCLUDING THE SAME

TECHNICAL FIELD

The present invention relates to an electrode assembly having a separator exhibiting a high elongation property and a secondary battery including the same.

BACKGROUND ART

As mobile devices have been increasingly developed, and the demand for such mobile devices has increased, the demand for secondary batteries has also sharply increased as an energy source for the mobile devices. Accordingly, much research into batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, on the other hand, the demand for lithium secondary batteries, such as lithium ion batteries and lithium ion polymer batteries, exhibiting high energy density, discharge voltage, and output stability, is very high.

Furthermore, secondary batteries may be classified based on the construction of an electrode assembly having a positive electrode/separator/negative electrode structure. For example, the electrode assembly may be configured to have a jelly-roll (wound) type structure in which long-sheet type positive electrodes and negative electrodes are wound while separators are disposed respectively between the positive electrodes and the negative electrodes, a stacked type structure in which pluralities of positive electrodes and negative electrodes, each having a predetermined size, are sequentially stacked while separators are disposed respectively between the positive electrodes and the negative electrodes, or a stacked/folded type structure in which pluralities of positive electrodes and negative electrodes, each having a predetermined size, are sequentially stacked while separators are disposed respectively between the positive electrodes and the negative electrodes to constitute a bi-cell or a full-cell, and then bi-cells or the full-cells are wound using a separator sheet.

In the electrode assembly having the positive electrode/separator/negative electrode structure, the electrodes may be simply stacked. Alternatively, a plurality of electrodes (i.e. positive electrodes and negative electrodes) may be stacked in a state in which separators are disposed respectively between the electrodes, and then the stacked electrodes may be coupled to each other by heat/pressure. In this case, the electrodes and the separators are coupled to each other by heating and pressing the electrodes and adhesive layers applied to the separators in a state in which the electrodes face the adhesive layers. In order to improve adhesion between the electrodes and the separators, each of the separators is coated with a binder material.

In a case in which a separator coated with a binder material is used in a electrochemical cell, such as a battery, if the adhesive force between binder powder and a separator substrate, the binder may be separated from the separator substrate during electrolyte injection and degassing processes, with the result that the separator may move, whereby the external appearance of the battery cell is deteriorated while the performance of the battery cell is reduced.

One of the principal research projects for secondary batteries is to improve the safety of the secondary batteries. In general, a lithium secondary battery may explode due to high temperature and pressure in the secondary battery which may be caused by an abnormal state of the secondary battery, such as a short circuit in the secondary battery, overcharge of the secondary battery with higher than allowed current or voltage, exposure of the secondary battery to high temperature, or drop of the secondary battery or external impact applied to the secondary battery.

In addition, in a case in which a sharp needle-shaped conductor, such as a nail, having high electrical conductivity penetrates into the electrode assembly, the positive electrode and the negative electrode of the electrode assembly are electrically connected to each other by the needle-shaped conductor, with the result that current flows to the needle-shaped conductor, the resistance of which is low. At this time, the electrodes through which the needle-shaped conductor has penetrated are deformed, and high resistance heat is generated due to conducting current in a contact resistance portion between the positive electrode active material and the negative electrode active material. In a case in which the temperature in the electrode assembly exceeds a critical temperature level due to the resistance heat, the oxide structure of the positive electrode active material collapses, and therefore a thermal runaway phenomenon occurs. As a result, the electrode assembly and the secondary battery may catch fire or explode.

Furthermore, in a case in which the electrode active material or the current collector bent by the needle-shaped conductor contacts the opposite electrode that the electrode active material or the current collector faces, the thermal runaway phenomenon may be further accelerated. These problems may be more serious in a bi-cell including a plurality of electrodes and an electrode assembly including the same.

Consequently, there is a high necessity for technology that is capable of more safely and efficiently securing the safety of the secondary battery.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have found that, in a case in which a separation film having an inorganic binder coating layer formed on the surface thereof is used as a separation film in a stacked/folded type secondary battery or in a case in which a safety separator having an inorganic binder coating layer formed on the surface thereof is used as the separation film and a separator in a unit cell located at each outermost side of the electrode assembly, it is possible to maximally prevent the occurrence of sparks when a needle-shaped conductor penetrates into the electrode assembly, since the separation film and the safety separator each have a predetermined thickness, whereby it is possible to improve the safety of the battery and to prevent the decrease in charging capacity of the electrode assembly. The present invention has been completed based on these findings.

Technical Solution

In accordance with one aspect of the present invention, the above and other objects can be accomplished by the provision of a stacked/folded type electrode assembly configured to have a structure in which two or more unit cells, each of which includes a separator disposed between a positive electrode and a negative electrode, each having an electrode mixture including an electrode active material applied to a current collector, are wound using a sheet type separation film, wherein the positive electrode is configured to have a structure in which a positive electrode mixture is coated on an aluminum foil as the current collector and the negative electrode is configured to have a structure in which a negative electrode mixture is coated on a metal foil, other than the aluminum foil, as the current collector, the unit cells include one or more full-cells and/or bi-cells, one of the unit cells located at each outermost side of the electrode assembly is configured such that one outermost electrode of the unit cell is a single-sided electrode, the single-sided electrode being configured such that the electrode mixture is applied only to one major surface of the current collector facing the separator, and the separation film has higher elongation than the separator.

In testing the safety of the battery when the needle-shaped conductor penetrates into the battery, high resistance heat, generated due to conducting current in a contact resistance portion between the positive electrode active material and the negative electrode active material which is caused by deformation of the electrodes when the needle-shaped conductor penetrates into the battery, may act as a principal cause of explosion or combustion of the battery. In a case in which the temperature in the electrode assembly exceeds a critical temperature level due to the resistance heat, the oxide structure of the positive electrode active material collapses, and therefore a thermal runaway phenomenon occurs. As a result, the battery may catch fire or explode.

In general, the positive electrode active material, which is made of an oxide, exhibits low electrical conductivity, with the result that the positive electrode active material has higher resistance than the negative electrode active material. On the other hand, the needle-shaped conductor, which is made of a metal, exhibits lower resistance than the positive electrode or the positive electrode active material. In order to reduce the resistance of a region of the electrode assembly through which the needle-shaped conductor penetrates and thus to improve the safety of the battery, therefore, it is very important to reduce the resistance of the positive electrode active material.

In a case in which a separator located at each outermost side of the electrode assembly has a predetermined thickness, therefore, the elongation of the separator may be improved, with the result that it is possible to prevent a direct contact between the needle-shaped conductor and the electrodes when the needle-shaped conductor penetrates into the electrode assembly, whereby it is possible to prevent the increase in resistance due to the direct contact therebetween.

In another electrode assembly according to the present invention, one of the unit cells located at each outermost side of the electrode assembly may be configured such that a separator facing the electrode mixture of the single-sided electrode, i.e. the outermost electrode, is a safety separator, and the safety separator has higher elongation than a separator in each of the other unit cells, i.e. a general separator. In a case in which the safety separators are used as the separators included in the unit cells located at the outermost sides of the electrode assembly, as described above, the battery cell may have improved safety against external impact, such as the penetration of the needle-shaped conductor into the electrode assembly.

The electrode assembly may be manufactured by winding unit cells in a state in which the unit cells are arranged on a long sheet type separation film at predetermined intervals such that the unit cells are stacked, placing the unit cell stack in a battery case, and sealing the battery case. In a concrete example, the unit cells may be bi-cells, which include first bi-cells, disposed at the outermost sides of the electrode assembly, and second bi-cells disposed between the first bi-cells.

A bi-cell is a battery cell, such as a unit cell having a positive electrode/separator/negative electrode/separator/positive electrode structure or a unit cell having a negative electrode/separator/positive electrode/separator/negative electrode structure, having the same electrodes as the outermost electrodes. In this specification, a unit cell having a positive electrode/separator/negative electrode/separator/positive electrode structure is defined as an A-type bi-cell, and a unit cell having a negative electrode/separator/positive electrode/separator/negative electrode structure is defined as a C-type bi-cell. That is, a bi-cell having a negative electrode as the middle electrode is defined as an A-type bi-cell, and a bi-cell having a positive electrode as the middle electrode is defined as a C-type bi-cell.

In a concrete example, each of the first bi-cells may be configured to have a structure in which a first positive electrode as a single-sided positive electrode, a second negative electrode as a double-sided negative electrode, and a second positive electrode as a double-sided positive electrode are sequentially stacked in a state in which separators are disposed respectively therebetween or a structure in which a first negative electrode as a single-sided negative electrode, a second positive electrode as a double-sided positive electrode, and a second negative electrode as a double-sided negative electrode are sequentially stacked in a state in which separators are disposed respectively therebetween, and each of the second bi-cells may be configured to have a structure in which a second negative electrode, a second positive electrode, and a second negative electrode are sequentially stacked in a state in which separators are disposed respectively therebetween or a structure in which a second positive electrode, a second negative electrode, and a second positive electrode are sequentially stacked in a state in which separators are disposed respectively therebetween.

The first bi-cells are bi-cells disposed at the outermost sides of the electrode assembly. The first positive electrode of each of the first bi-cells includes a first surface that is coated with a positive electrode active material and is disposed so as to face a corresponding separator and a second surface that is coated with no positive electrode active material and is disposed so as to face the outside of the electrode assembly. On the other hand, the first negative electrode of each of the first bi-cells may correspond to the first positive electrode, and the negative electrode active material may correspond to positive electrode active material. That is, the first negative electrode includes a first surface that is coated with a negative electrode active material and is disposed so as to face a corresponding separator and a second surface that is coated with no negative electrode active material and is disposed so as to face the outside of the electrode assembly.

As long as each of the first bi-cells or the second bi-cells is configured to have a structure in which the electrodes disposed at the opposite sides of each of the first bi-cells or the second bi-cells are the same, the number of positive electrodes, negative electrodes, and separators constituting each of the first bi-cells or the second bi-cells is not particularly restricted.

The unit cells may be full-cells, and the full-cells may include first full-cells, disposed at the outermost sides of the electrode assembly, and second full-cells disposed between the first full-cells.

A full-cell is a cell, such as a unit cell having a positive electrode/separator/negative electrode structure or a unit cell having a negative electrode/separator/positive electrode structure, configured such that different electrodes are located at opposite sides of the cell. Since the electrodes at the outermost sides of each full-cell are different from each other, full-cells may be wound in a state in which the full-cells are placed such that the electrodes of the full-cells are aligned with each other.

In a concrete example, each of the first full-cells may be configured to have a structure in which a first positive electrode as a single-sided positive electrode, a separator, and a second negative electrode as a double-sided negative electrode are sequentially stacked or a structure in which a first negative electrode as a single-sided negative electrode, a separator, and a second positive electrode as a double-sided positive electrode are sequentially stacked, and each of the second full-cells may be configured to have a structure in which a second negative electrode as a double-sided negative electrode, a separator, and a second positive electrode as a double-sided positive electrode are sequentially stacked or a structure in which a second positive electrode as a double-sided positive electrode, a separator, and a second negative electrode as a double-sided negative electrode are sequentially stacked.

The first full-cells are full-cells disposed at the outermost sides of the electrode assembly. The first positive electrode of each of the full-cells includes a first surface that is coated with a positive electrode active material and is disposed so as to face the separator and a second surface that is coated with no positive electrode active material and is disposed so as to face the outside of the electrode assembly. On the other hand, the first negative electrode of each of the full-cells includes a first surface that is coated with a negative electrode active material and is disposed so as to face the separator and a second surface that is coated with no negative electrode active material and is disposed so as to face the outside of the electrode assembly.

As long as each of the first full-cells or the second full-cells is configured to have a structure in which the electrodes disposed at the opposite sides of each of the first full-cells or the second full-cells are different, the number of positive electrodes, negative electrodes, and separators constituting each of the first full-cells or the second full-cells is not particularly restricted.

In another electrode assembly according to the present invention, the safety separator included in each of the unit cells located at the outermost sides of the electrode assembly may have higher elongation than a general separator included in each of the other unit cells. The electrode assembly may include third bi-cells, disposed at the outermost sides of the electrode assembly, and fourth bi-cells disposed between the third bi-cells.

Specifically, each of the third bi-cells may be configured to have a structure in which a first positive electrode as a single-sided positive electrode, a second negative electrode as a double-sided negative electrode, and a second positive electrode as a double-sided positive electrode are sequentially stacked in a state in which safety separators are disposed respectively therebetween or a structure in which a first negative electrode as a single-sided negative electrode, a second positive electrode as a double-sided positive electrode, and a second negative electrode as a double-sided negative electrode are sequentially stacked in a state in which safety separators are disposed respectively therebetween, and each of the fourth bi-cells may be configured to have a structure in which a second negative electrode, a second positive electrode, and a second negative electrode are sequentially stacked in a state in which general separators are disposed respectively therebetween or a structure in which a second positive electrode, a second negative electrode, and a second positive electrode are sequentially stacked in a state in which general separators are disposed respectively therebetween.

In this case, at least one safety separator may be included in each of the third bi-cells. Specifically, safety separators may be used as the outermost electrodes of each of the third bi-cells and a separator disposed between inside electrodes adjacent to the outermost electrodes.

The unit cells may be full-cells, and the full-cells may include third full-cells, disposed at the outermost sides of the electrode assembly, and fourth full-cells disposed between the third full-cells.

Specifically, each of the third full-cells may be configured to have a structure in which a first positive electrode as a single-sided positive electrode, a safety separator, and a second negative electrode as a double-sided negative electrode are sequentially stacked or a structure in which a first negative electrode as a single-sided negative electrode, a safety separator, and a second positive electrode as a double-sided positive electrode are sequentially stacked, and each of the fourth full-cells may be configured to have a structure in which a second negative electrode as a double-sided negative electrode, a general separator, and a second positive electrode as a double-sided positive electrode are sequentially stacked or a structure in which a second positive electrode as a double-sided positive electrode, a general separator, and a second negative electrode as a double-sided negative electrode are sequentially stacked.

In the electrode assembly according to the present invention, the separation film and the safety separator are thicker than the general separator. Consequently, the elongation of the separation film and the safety separator may be higher than the elongation of the general separator. Specifically, the elongation of the separation film and the safety separator may be 105 to 500% of the elongation of the general separator. More specifically, the elongation of the separation film and the safety separator may be 120 to 300% of the elongation of the general separator.

In a case in which the elongation of the separation film is less than 105% of the elongation of the general separator, it is difficult to achieve the effect of preventing contact between the electrode active material or the current collector and the opposite electrode as the number of full-cells or bi-cells stacked in order to constitute the electrode assembly is increased. On the other hand, in a case in which the elongation of the separation film is greater than 500% of the elongation of the general separator, the thickness of the separation film is increased in order to exhibit the above effect, with the result that the capacity of the battery is reduced, which is not preferable.

In addition, the electrode assembly according to the present invention is configured to have a structure that is capable of preventing the reduction in capacity of the battery and improving the safety of the battery. In a concrete example, the separation film and the separator each may be an organic/inorganic composite porous safety-reinforcing separator (SRS).

The SRS separator may be manufactured by applying an active layer, including inorganic particles and a binder polymer, to a polyolefin-based separator substrate. In this case, the SRS separator has a pore structure included in the separator substrate and a uniform pore structure formed by the interstitial volume among inorganic particles as active layer ingredients.

The SRS separator, which is composed of the inorganic particles and the binder polymer, does not suffer high-temperature shrinkage due to thermal resistance of the inorganic particles. Therefore, although, in an electrochemical device using the organic/inorganic composite porous film as a separator, the separator bursts in the battery due to excessive internal or external factors, such as high temperature, overcharge, and external impact, it is difficult for both electrodes to be completely short-circuited by an organic/inorganic composite porous active layer and, if a short circuit occurs, the expansion of the short-circuited area may be prevented. Accordingly, battery stability may be improved.

In the organic/inorganic composite porous separator, one of the active layer ingredients formed in some pores of a surface and/or a substrate of the polyolefin-based separator substrate is inorganic particles which are conventionally known in the art. The inorganic particles may form empty space among inorganic particles and thereby may form micro pores and maintain a physical shape as a spacer. In addition, physical characteristics of the inorganic particles are not generally changed at a temperature of 200° C. or more and, as such, a formed organic/inorganic composite porous film has excellent thermal resistance.

The inorganic particles are not particularly restricted so long as the inorganic particles are electrochemically stable. That is, the inorganic particles that can be used in the present invention are not particularly restricted so long as the inorganic particles are not oxidized and/or reduced within an operating voltage range (e.g. 0 to 5 V based on Li/Li+) of a battery to which inorganic particles are applied. In particular, in a case in which inorganic particles having ion transfer ability are used, it is possible to improve ion conductivity in an electrochemical element, thereby improving the performance of the battery. Consequently, it is preferable that ion conductivity of the inorganic particles be as high as possible. In addition, in a case in which the inorganic particles have high density, it may be difficult to disperse the inorganic particles at the time of coating, and the weight of the battery may increase. For these reasons, it is preferable that density of the inorganic particles be as low as possible. Additionally, in a case in which the inorganic particles have high permittivity, a degree of dissociation of electrolyte salt, such as lithium salt, in a liquid electrolyte may increase, thereby improving ion conductivity of the electrolytic solution.

Due to the reasons described above, the inorganic particles may be one or more kinds of inorganic particles selected from a group consisting of (a) inorganic particles having piezoelectricity and (b) inorganic particles having lithium ion transfer ability.

The inorganic particles having piezoelectricity mean a material which is a nonconductor at normal pressure but, when a certain pressure is applied thereto, an internal structure is changed and thereby has conductivity. In particular, the inorganic particles having piezoelectricity exhibit high dielectric constant characteristics having a dielectric constant of 100 or more and have a potential difference between both faces in which one face is charged by a positive electrode and the other face is charged by a negative electrode by electric charges generated when the inorganic particles are tensioned or compressed by a certain pressure.

In a case in which the inorganic particles having the above-mentioned characteristics are used as a porous active layer ingredient, a short-circuit may occur in the positive electrode and the negative electrode due to external impact, such as a needle-shaped conductor, whereby positive electrode and the negative electrode may not directly contact each other due to inorganic particles coated on a separator, and potential differences in particles may occur due to piezoelectricity of the inorganic particles. Accordingly, electron migration, namely, fine current flow, is achieved between both electrodes, whereby voltage of the battery is gradually reduced, and therefore stability may be improved.

The inorganic particles having piezoelectricity may be one or more kinds of inorganic particles selected from a group consisting of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, but the present invention is not limited thereto.

The inorganic particles having lithium ion transfer ability indicate inorganic particles which contain lithium elements, do not save lithium, and transport lithium ions. The inorganic particles having lithium ion transfer ability may transfer and transport lithium ions by a defect present in a particle structure. Consequently, lithium ionic conductivity in a battery is improved, and therefore battery performance may be improved.

The inorganic particles having lithium ion transfer ability may be one or more kinds of inorganic particles selected from a group consisting of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$), lithium lanthanum titanate ($Li_xLa_yTiO_3$, where $0<x<2$ and $0<y<3$), lithium germanium thio phosphate ($Li_xGe_yP_zS_w$, where $0<x<4$, $0<y<1$, $0<z<1$, and $0<w<5$), lithium nitride ($Li_xN_y$, where $0<x<4$ and $0<y<2$), $SiS_2$-based glass ($Li_xSi_yS_z$, where $0<x<3$, $0<y<2$, and $0<z<4$), $P_2S_5$-based glass ($Li_xP_yS_z$, where $0<x<3$, $0<y<3$, and $0<z<7$), and a mixture thereof, but the present invention is not limited thereto.

A composition ratio of the inorganic particles and the binder polymer, which constitute the active layer ingredient, is not greatly limited and may be controlled in a range of 10:90 to 99:1 wt %, preferably 80:20 to 99:1 wt %. In a case in which the composition ratio is less than 10:90 wt %, the amount of polymer is excessively increased and thereby pore sizes and porosity are reduced due to reduction of interstitial volume formed among inorganic particles, and, accordingly, final battery performance is deteriorated. On the contrary, in a case in which the composition ratio exceeds 99:1 wt %, the amount of a polymer is too low and thereby adhesive strength among inorganic matters is weakened, and, accordingly, the mechanical properties of a final organic/inorganic composite porous separator may be deteriorated.

In a concrete example, the separation film and the safety separator each may have a thickness of 16 to 30 micrometers, and the general separator may have a thickness of 10 to 16 micrometers.

More specifically, the separation film and the safety separator each may have a thickness of 20 micrometers in consideration of the elongation and volume of the separators when the needle-shaped conductor penetrates into the electrode assembly. In a case in which the thickness of the separation film and the safety separator is less than 16 micrometers, the separation film and the safety separator cannot be sufficiently elongated when the needle-shaped conductor penetrates into the electrode assembly, whereby the safety of the electrode assembly is not secured. On the other hand, in a case in which the thickness of the separation film and the safety separator exceeds 30 micrometers, the volume of the separator may be increased, with the result that charging capacity may be reduced, which is not preferable.

The active layer of the organic/inorganic composite porous separator may include other conventionally known additives, in addition to the inorganic particles and the polymer described above.

In the organic/inorganic composite porous separator, the substrate coated with the mixture of the inorganic particles and the binder polymer as ingredients of the active layer may be, for example, a polyolefin-based separator conventionally used in the art. The polyolefin-based separator ingredient may be, for example, high-density polyethylene, linear low-density polyethylene, low-density polyethylene, ultra-high molecular weight polyethylene, polypropylene, derivatives thereof, or the like.

Hereinafter, other components of the electrode assembly according to the present invention will be described.

The positive electrode may be manufactured, for example, by applying a mixture of a positive electrode active material, a conductive agent, and a binder to a positive electrode current collector and drying the applied mixture. A filler may be further added to the mixture as needed.

In general, the positive electrode current collector has a thickness of 3 to 500 μm.

The positive electrode current collector is not particularly restricted so long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or plastic carbon. Alternatively, the positive electrode current collector may be made of aluminum or stainless steel, the surface of which is treated with carbon, nickel, titanium, or silver. Specifically, the positive electrode current collector may be made of aluminum. The positive electrode current collector may have a micro-scale uneven pattern formed at the surface thereof so as to increase the adhesive force of the positive electrode active material. The positive electrode current collector may be configured in various forms, such as a film, a sheet, a foil, a net, a porous body, a foam body, and a non-woven fabric body.

The conductive agent is generally added so that the conductive agent has 1 to 50 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 50 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

The negative electrode is prepared by applying, drying, and pressing a negative electrode active material to a negative electrode current collector. The above-described conductive agent, the binder, and the filler may be selectively added to the negative electrode active material as needed.

In general, the negative electrode current collector has a thickness of 3 to 500 μm.

The negative electrode current collector is not particularly restricted so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In the same manner as in the positive electrode current collector, the negative electrode current collector may have a micro-scale uneven pattern formed at the surface thereof so as to increase adhesive force of the negative electrode active material. The negative electrode current collector may be configured in various forms, such as a film, a sheet, a foil, a net, a porous body, a foam body, and a non-woven fabric body.

In accordance with another aspect of the present invention, there is provided a secondary battery having the electrode assembly with the above-stated construction mounted in a battery case.

The battery case may be a pouch-shaped case made of an aluminum laminate sheet or a metal can-shaped case, but the present invention is not limited thereto.

The secondary battery may be a lithium secondary battery including an electrode assembly and a non-aqueous electrolyte containing lithium salt.

The non-aqueous electrolyte containing lithium salt is composed of a non-aqueous electrolyte and lithium salt. A non-aqueous organic solvent, an organic solid electrolyte, or an inorganic solid electrolyte may be used as the non-aqueous electrolyte. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas. In addition, fluoroethylene carbonate (FEC) and propene sultone (PRS) may be further included.

In a preferred example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and liner carbonate, such as DEC, DMC, or EMC, which is a low viscosity solvent, to prepare a non-aqueous electrolyte containing lithium salt.

In accordance with other aspects of the present invention, there are a battery pack including the secondary battery with the above-stated construction as a unit battery and a device including the battery pack as a power source.

The device may be selected from among a mobile phone, a portable computer, a smartphone, a smart pad, a tablet PC, and a netbook computer. However, the present invention is not limited thereto.

Those skilled in the art will appreciate that various applications and modifications are possible within the category of the present invention based on the above description.

DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
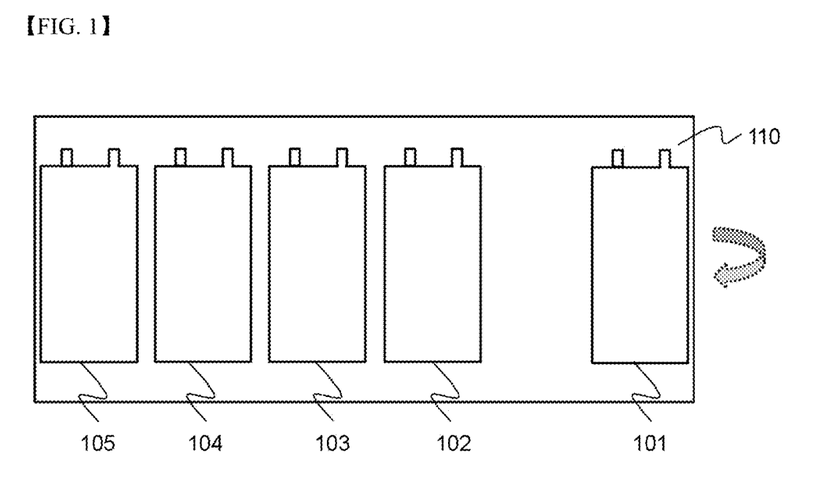
FIG. 1 is a typical view showing a state before unit cells are wound in order to form an electrode assembly.

FIG. 1 is a typical view showing a state before unit cells are wound in order to form an electrode assembly. Specifically, FIG. 1 is a typical view showing a state in which unit cells are located on a separation film 110. Referring to FIG. 1, unit cells (bi-cells and/or full-cells) 101, 102, 103, 104, and 105 are sequentially located on the separation film 110. The unit cell 101 and the unit cell 102 are spaced apart from each other by a width of one of the unit cells.

A safety-reinforcing separator (SRS) is used as each separator located in each of the unit cells 101, 102, 103, 104, and 105 and the separation film 110. The SRS separator is formed by coating an active layer, including inorganic particles and a binder polymer, on a polyolefin-based separator substrate. Consequently, the SRS separator has a structure that is not greatly affected by external impact.

The separation film, which wraps the unit cells constituting the electrode assembly according to the present invention, is thicker than general separators included in each of the unit cells. Consequently, the thickness of the separation film, which comes into contact with a needle-shaped conductor first when the needle-shaped conductor penetrates into the electrode assembly, is increased and the elongation of the separation film is improved, while preventing the increase in volume of the electrode assembly and preventing the decrease in charging capacity of the electrode assembly, whereby it is also possible to improve the safety of the electrode assembly against external impact.

Figure 2:
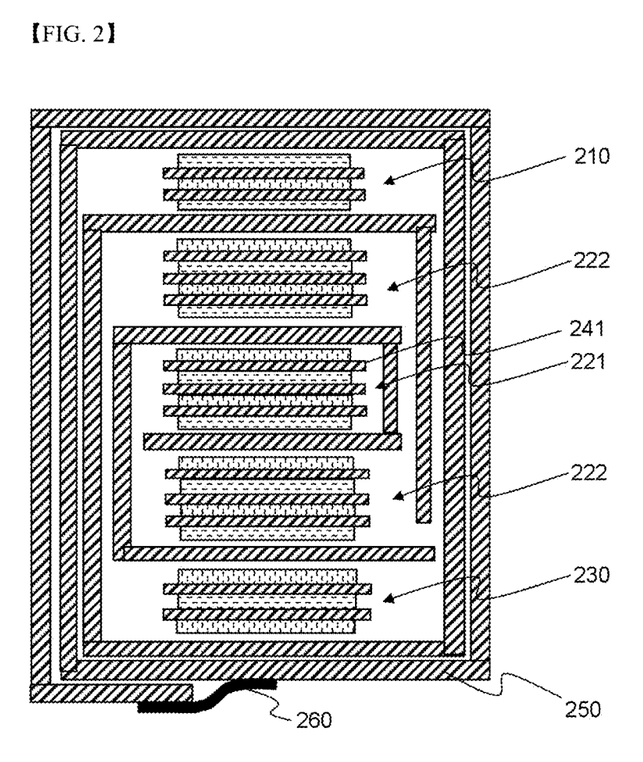
FIG. 2 is a typical view showing a stacked/folded electrode assembly according to an embodiment of the present invention.

FIG. 2 is a typical view showing a stacked/folded electrode assembly according to an embodiment of the present invention.

Referring to FIG. 2, first bi-cells 210 and 230 are respectively disposed at the uppermost end and the lowermost end of the electrode assembly, and second full-cells 221 and 222 are disposed between the first bi-cells 210 and 230. Some or all of the second full-cells 221 and 222 may be replaced by second bi-cells. In addition, second bi-cells may be further included in addition to the second full-cells 221 and 222. An insulative tape 260 for stably maintaining the stacked and folded structure is added to the end of the electrode assembly at which the folding process is ended.

The first bi-cells 210 and 230 and the second full-cells 221 and 222 include general separators 241. A separation film 250, which is used to form the stacked/folded electrode assembly, is thicker than the general separators 241. Specifically, the separation film 250 has a thickness of 16 to 30 micrometers. On the other hand, each of the general separators 241 has a thickness of 10 to 16 micrometers. In general, the elongation of the separation film 250 may be 105 to 500% of the elongation of the general separators 241.

Figure 3:
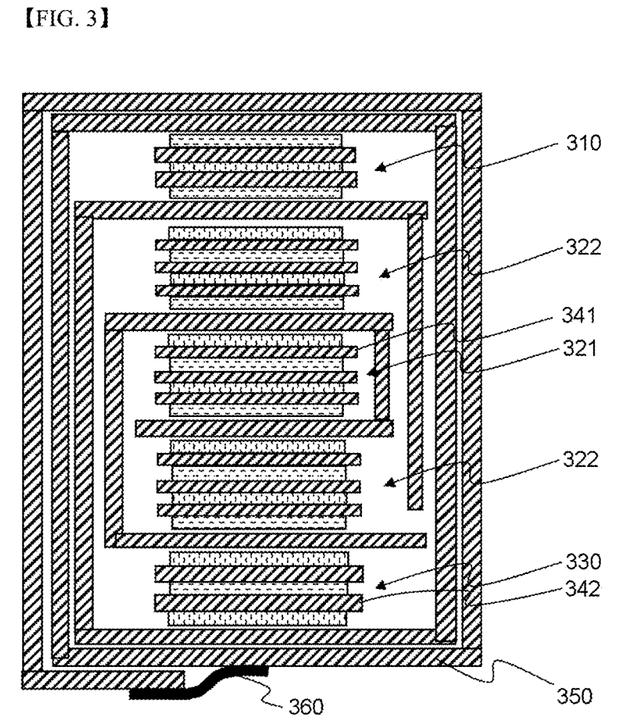
FIG. 3 is a typical view showing a stacked/folded electrode assembly according to another embodiment of the present invention.

FIG. 3 is a typical view showing a stacked/folded electrode assembly according to another embodiment of the present invention.

Referring to FIG. 3, third bi-cells 310 and 330 are respectively disposed at the uppermost end and the lowermost end of the electrode assembly, and fourth full-cells 321 and 322 are disposed between the third bi-cells 310 and 330. Some or all of the fourth full-cells 321 and 322 may be replaced by fourth bi-cells. In addition, fourth bi-cells may be further included in addition to the fourth full-cells 321 and 322. An insulative tape 360 for stably maintaining the stacked and folded structure is added to the end of the electrode assembly at which the folding process is ended.

The third bi-cells 310 and 330 include safety separators 342, and the fourth full-cells 321 and 322 include general separators 341. A separation film 350, which is used to form the stacked/folded electrode assembly, and the safety separators 342 are thicker than the general separators 341. Specifically, the separation film 350 and the safety separators 342 each have a thickness of 16 to 30 micrometers. On the other hand, each of the general separators 341 has a thickness of 10 to 16 micrometers. In general, the elongation of the separation film 350 and the safety separators 342 may be 105 to 500% of the elongation of the general separators 341.

Figure 4:
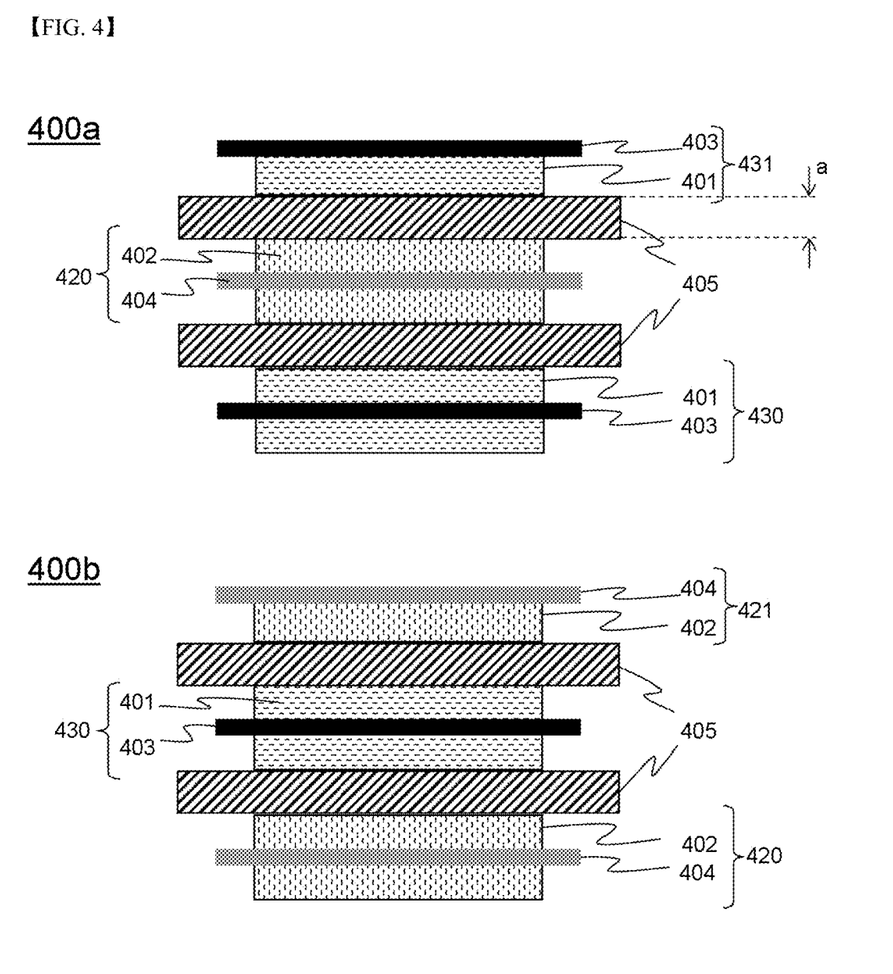
FIG. 4 is a vertical sectional view showing a bi-cell according to an embodiment of the present invention.
Figure 5:
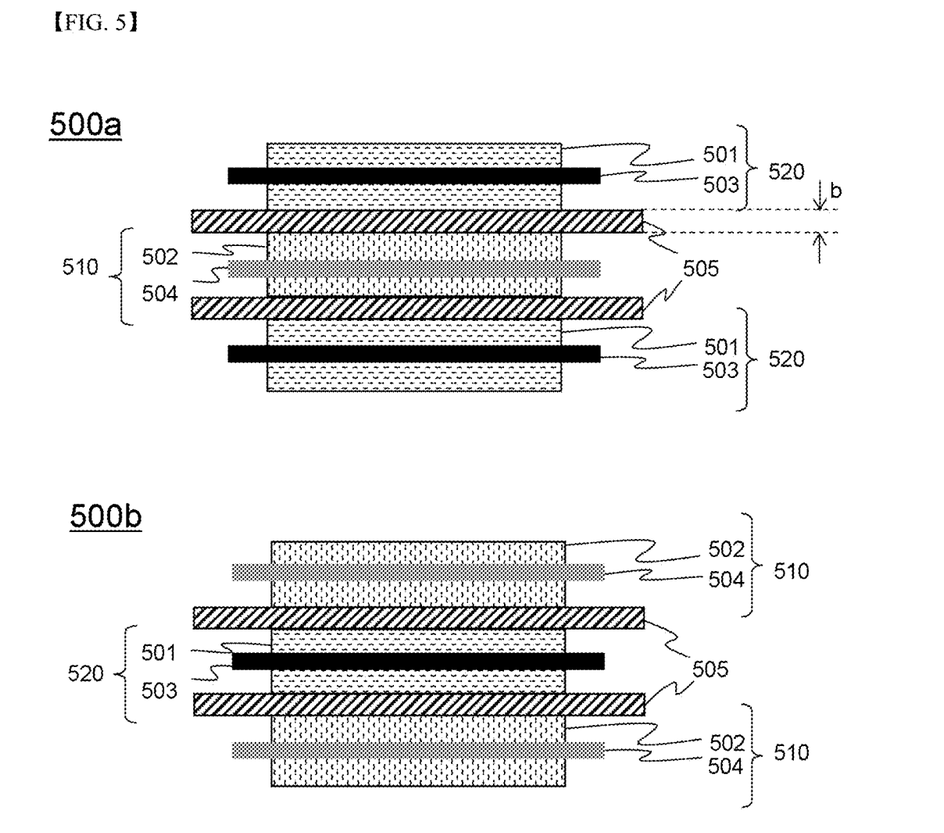
FIG. 5 is a vertical sectional view showing a bi-cell according to another embodiment of the present invention.

FIG. 4 is a vertical sectional view showing a bi-cell according to an embodiment of the present invention, and FIG. 5 is a vertical sectional view showing a bi-cell according to another embodiment of the present invention.

Referring to FIG. 4, the bi-cell is configured such that one of the outermost electrodes of the bi-cell is a single-sided electrode. The bi-cell may be a first bi-cell or a third bi-cell that is located at one of the outermost sides of the electrode assembly. A bi-cell 400a is an A-type bi-cell having a negative as a middle electrode. The bi-cell 400a is configured such that a first positive electrode 431, a separator 405, a second negative electrode 420, a separator 405, and a second positive electrode 430 are sequentially stacked. In a case in which the bi-cell 400a is a first bi-cell, general separators may be used as the separators 405. In a case in which the bi-cell 400a is a third bi-cell, on the other hand, safety separators may be used as the separators 405.

The first positive electrode 431 is a single-sided electrode configured such that a positive electrode active material 401 is applied only to one major surface of a positive electrode current collector 403 facing a corresponding one of the separators 405. The second negative electrode 420 is a double-sided electrode configured such that a negative electrode active material 402 is applied to each major surface of a negative electrode current collector 404, and the second positive electrode 430 is a double-sided electrode configured such that a positive electrode active material 401 is applied to each major surface of a positive electrode current collector 403.

Meanwhile, each of the separators 405 is an SRS separator. Each of the separators 405 may have an appropriate thickness to improve the safety of a secondary battery and to prevent the reduction in charging and discharging capacities of the secondary battery.

Another bi-cell 400b is a C-type bi-cell having a positive electrode as a middle electrode. The bi-cell 400b is different from the bi-cell 400a in that the electrodes are arranged in reverse order. Consequently, the positive electrode current collector 403 and the positive electrode active material 401 may correspond to the negative electrode current collector 404 and the negative electrode active material 402, respectively.

Referring to FIG. 5, the bi-cell is configured such that all of the electrodes are double-sided electrodes. The bi-cell may be a second bi-cell or a fourth bi-cell that is located between the bi-cells located at the outermost sides of the electrode assembly. A bi-cell 500a is configured such that a second positive electrode 520, a general separator 505, a second negative electrode 510, a general separator 505, and a second positive electrode 520 are sequentially stacked. A bi-cell 500b is configured such that a second negative electrode 510, a general separator 505, a second positive electrode 520, a general separator 505, and a second negative electrode 510 are sequentially stacked.

In the bi-cell 500a, the second positive electrode 520 is a double-sided electrode configured such that a positive electrode active material 501 is applied to each major surface of a positive electrode current collector 503, and the second negative electrode 510 is a double-sided electrode configured such that a negative electrode active material 502 is applied to each major surface of a negative electrode current collector 504.

In a case in which the bi-cells 400a and 400b are third bi-cells, the separators 405 may be safety separators. A thickness a of each of the safety separators is greater than a thickness b of each of the general separators 505, which are included in the bi-cells 500a and 500b (b<a).

Figure 6:
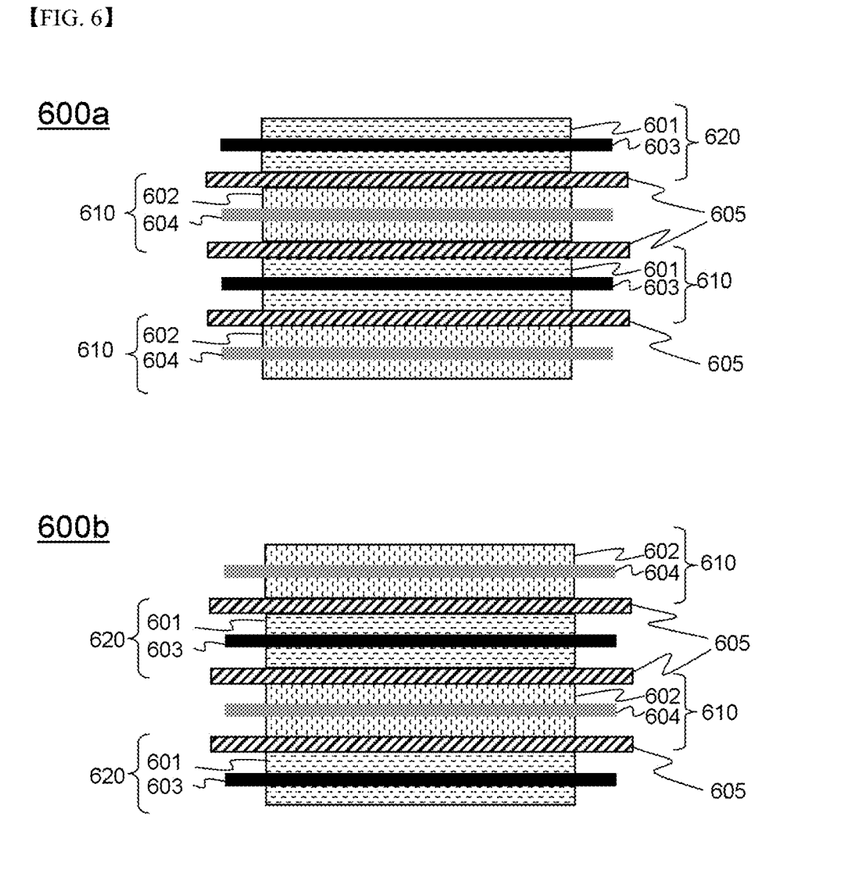
FIG. 6 is a vertical sectional view showing a full-cell according to an embodiment of the present invention.

FIG. 6 is a vertical sectional view showing a full-cell that constitutes an electrode assembly according to an embodiment of the present invention. Specifically, the full-cell is a second full-cell or a fourth full-cell located in the electrode assembly. Full-cells 600a and 600b are configured such that second positive electrodes 620 and second negative electrodes 610 are alternately stacked in a state in which general separators 605 are disposed respectively between the second positive electrodes 620 and the second negative electrodes 610. Specifically, the full-cells 600a is configured to have a structure in which a second positive electrode 620, having a positive electrode active material 601 applied to each major surface of a second positive electrode current collector 603, a general separator 605, and a second negative electrode 610, having a negative electrode active material 602 applied to each major surface of a second negative electrode current collector 604 are repeatedly stacked. On the other hand, the full-cells 600b are configured to have a structure in which a second negative electrode 610, a general separator 605, and a second positive electrode 620 are repeatedly stacked.

In another embodiment of the present invention, the electrode assembly may include a first full-cell and a third full-cell, each of which is configured such that one of the outermost electrodes of the full-cell is a single-sided electrode, i.e. a first positive electrode and/or a second negative electrode, as the outermost unit cells. The first full-cell and the third full-cell are different from each other in that the first full-cell includes general separators while the third full-cell includes safety separators.

In addition, as described above, the elongation of the safety separators is higher than the elongation of the general separators. The elongation of the safety separators may be the same as the elongation of the separation film.

The unit cells 400a, 400b, 500a, 500b, 600a, and 600b of the present invention exhibit improved safety against the penetration of a needle-shaped conductor by the provision of the separation film, as described above. Hereinafter, a state in which a needle-shaped conductor penetrates perpendicularly into an electrode assembly, configured such that the unit cells 400a, 400b, 500a, 500b, 600a, and 600b of the present invention are stacked in a state of being wound using the separation film, will be described in detail with reference to FIG. 6.

Figure 7:
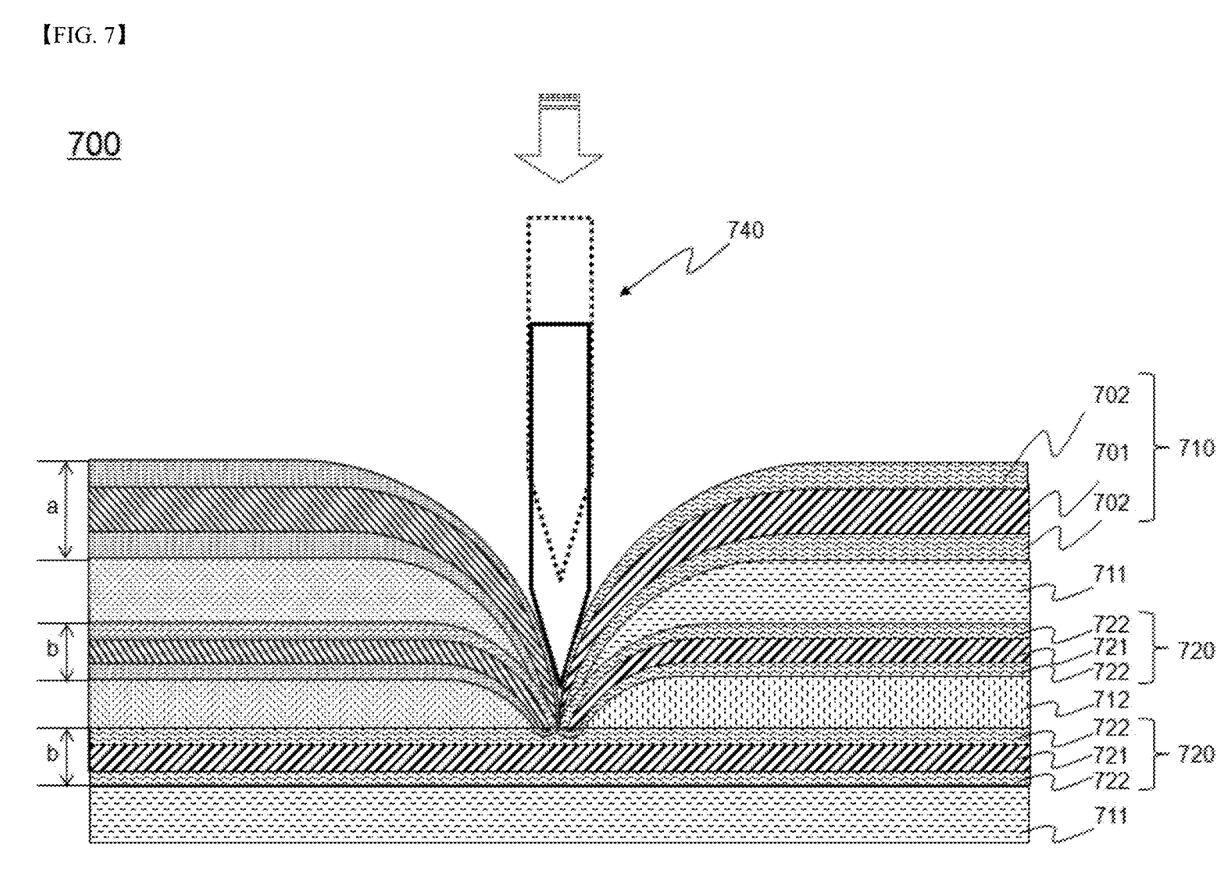
FIG. 7 is a partial typical view showing the outermost region of an electrode assembly according to an embodiment of the present invention, into which a needle-shaped conductor penetrates.

FIG. 7 is a partial typical view showing the outermost region of an electrode assembly according to an embodiment of the present invention, into which a needle-shaped conductor penetrates. Specifically, FIG. 7 shows a portion of an electrode assembly configured such that a unit cell stack, including the outermost unit cells having general separators, is wound using a separation film.

Referring to FIG. 7, a separation film 710, which is wound in a state in which the unit cell stack is placed on the separation film 710 in order to form an electrode assembly, is an SRS separator configured such that an active layer 702, including inorganic particles and a binder polymer, is applied to each major surface of a separator substrate 701. The thickness of the separation film 710 is greater than the thickness of a general separator 720 disposed between a positive electrode 711 and a negative electrode 712 that constitute a bi-cell or a full-cell (a>b). Positive electrodes located at the outermost sides of the electrode assembly may be first positive electrodes, each of which is a single-sided electrode for preventing the occurrence of a short circuit to improve the safety of the electrode assembly.

In the above structure, when a needle-shaped conductor 740 penetrates perpendicularly into the electrode assembly, the needle-shaped conductor 740 penetrates sequentially penetrates through the separation film 710, the positive electrode 711, the general separator 720, the negative electrode 712, and the general separator 720. At this time, the needle-shaped conductor 740 penetrates through the separation film 710, and the separation film 710 elongates in the direction in which the needle-shaped conductor 740 moves, attributable to the penetration force and frictional force of the needle-shaped conductor 740. As a result, the separation film 710 contacts the needle-shaped conductor 740 in a state in which the separation film 710 surrounds the positive electrode 711, the general separator 720, and the negative electrode 712. Consequently, it is possible to prevent a direct contact between the needle-shaped conductor 740 and the electrodes 711 and 712 or between the positive electrode 711 and the negative electrode 712.

Figure 8:
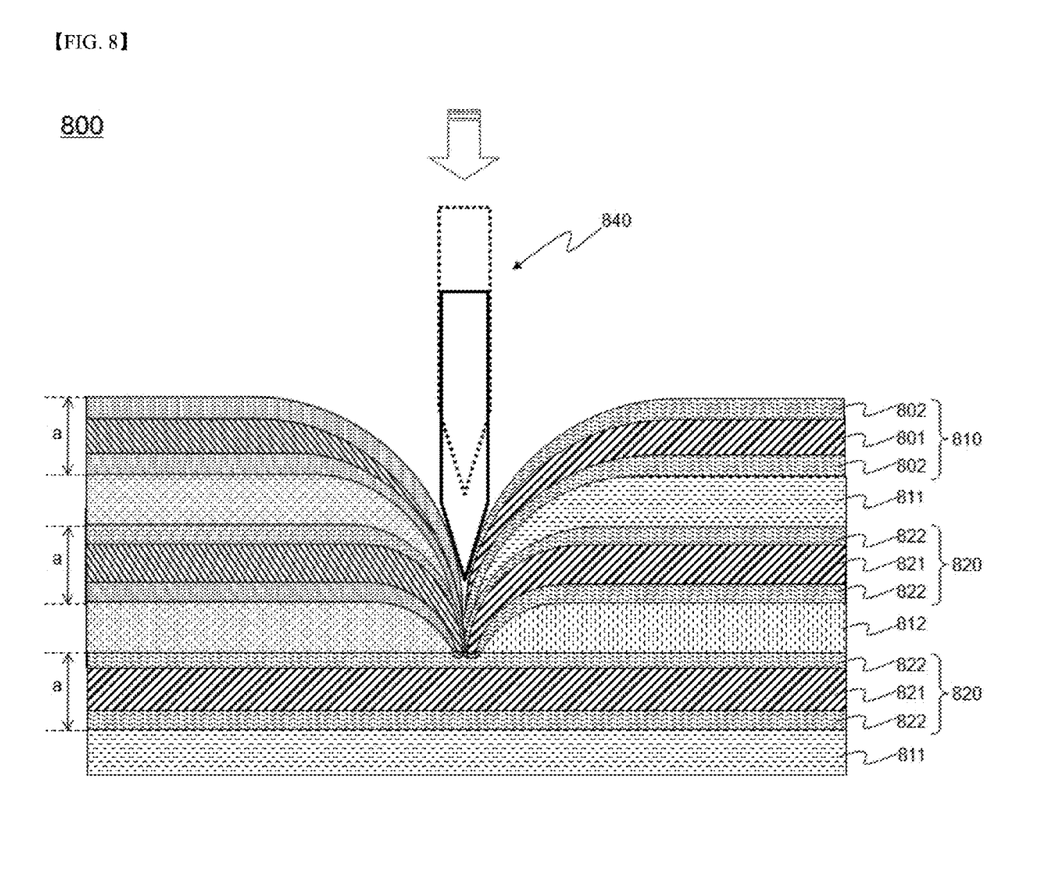
FIG. 8 is a partial typical view showing the outermost region of an electrode assembly according to another embodiment of the present invention, into which a needle-shaped conductor penetrates.

FIG. 8 is a partial typical view showing the outermost region of an electrode assembly according to another embodiment of the present invention, into which a needle-shaped conductor penetrates. Specifically, FIG. 8 shows a portion of an electrode assembly configured such that a unit cell stack, including the outermost unit cells having safety separators, is wound using a separation film.

Referring to FIG. 8, a separation film 810, which is wound in a state in which the unit cell stack is placed on the separation film 710 in order to form an electrode assembly, is an SRS separator configured such that an active layer 802, including inorganic particles and a binder polymer, is applied to each major surface of a separator substrate 801. The thickness a of the separation film 810 is equal to the thickness of a safety separator 820 disposed between a positive electrode 811 and a negative electrode 812 that constitute a third bi-cell or a third full-cell. Positive electrodes located at the outermost sides of the electrode assembly may be third positive electrodes, each of which is a single-sided electrode for preventing the occurrence of a short circuit to improve the safety of the electrode assembly.

In the above structure, when a needle-shaped conductor 840 penetrates perpendicularly into the electrode assembly, the needle-shaped conductor 840 penetrates sequentially penetrates through the separation film 810, the positive electrode 811, the safety separator 820, the negative electrode 812, and the safety separator 820. At this time, the needle-shaped conductor 840 penetrates through the separation film 810, and the separation film 810 elongates in the direction in which the needle-shaped conductor 840 moves, attributable to the penetration force and frictional force of the needle-shaped conductor 840. As a result, the separation film 810 contacts the needle-shaped conductor 840 in a state in which the separation film 810 surrounds the positive electrode 811, the safety separator 820, and the negative electrode 812. Consequently, it is possible to prevent a direct contact between the needle-shaped conductor 840 and the electrodes 811 and 812 or between the positive electrode 811 and the negative electrode 812.

Therefore, it is possible to prevent the electrode assembly from catching fire as the result of the electrode assembly being heated by the needle-shaped conductor 840.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, according to the present invention, a separator, including an inorganic binder coating layer and having a predetermined thickness, is used as a separation film and a safety separator in a stacked/folded type secondary battery. Consequently, it is possible to fundamentally solve an abrupt safety reduction problem due to external impact by the provision of the inorganic particles while maintaining a winding assembly property of a conventional separator.

In addition, according to the present invention, a general separator having a small thickness is used for unit cells located in an electrode assembly. Consequently, it is possible for the electrode assembly to provide a high capacity to volume ratio while maintaining electrical performances, such as high capacity, a rate property, and electrical capacity. In addition, the elongation of a separation film and a safety separator included in the outermost unit cells of the electrode assembly is higher than the elongation of the general separator. Consequently, it is possible to maximally prevent the occurrence of sparks when a needle-shaped conductor penetrates into the electrode assembly, thereby improving the safety of the battery.

The invention claimed is:

1. A stacked/folded type electrode assembly configured to have a structure in which two or more unit cells, each of which comprises a separator disposed between a positive electrode and a negative electrode, each having an electrode mixture comprising an electrode active material applied to a current collector, are wound using a sheet type separation film, wherein the positive electrode is configured to have a structure in which a positive electrode mixture is coated on an aluminum foil as the current collector, and the negative electrode is configured to have a structure in which a negative electrode mixture is coated on a metal foil, other than the aluminum foil, as the current collector, the unit cells comprise one or more full-cells and/or bi-cells, one of the unit cells located at each outermost side of the electrode assembly is configured such that one outermost electrode of the unit cell is a single-sided electrode, the single-sided electrode being configured such that the electrode mixture is applied only to one major surface of the current collector facing the separator, the separation film has higher elongation than the separator, the one of the unit cells located at each outermost side of the electrode assembly is configured such that a separator facing the electrode mixture of the single-sided electrode is a safety separator, the unit cells other than the one of the unit cells located at each outermost side of the electrode assembly is configured such that the separators are general separators, the safety separator has higher elongation than the general separator, and each of the unit cells includes at least two separators of the same type.

2. The electrode assembly according to claim 1, wherein the electrode assembly comprises first bi-cells, disposed at the outermost sides of the electrode assembly, and second bi-cells disposed between the first bi-cells.

3. The electrode assembly according to claim 2, wherein each of the first bi-cells is configured to have a structure in which a first positive electrode as a single-sided positive electrode, a second negative electrode as a double-sided negative electrode, and a second positive electrode as a double-sided positive electrode are sequentially stacked in a state in which separators are disposed respectively therebetween or a structure in which a first negative electrode as a single-sided negative electrode, a second positive electrode as a double-sided positive electrode, and a second negative electrode as a double-sided negative electrode are sequentially stacked in a state in which separators are disposed respectively therebetween, and each of the second bi-cells is configured to have a structure in which a second negative electrode, a second positive electrode, and a second negative electrode are sequentially stacked in a state in which separators are disposed respectively therebetween or a structure in which a second positive electrode, a second negative electrode, and a second positive electrode are sequentially stacked in a state in which separators are disposed respectively therebetween.

4. The electrode assembly according to claim 1, wherein the unit cells are full-cells, the full-cells comprising first full-cells, disposed at the outermost sides of the electrode assembly, and second full-cells disposed between the first full-cells.

5. The electrode assembly according to claim 4, wherein each of the first full-cells is configured to have a structure in which a first positive electrode as a single-sided positive electrode, a separator, and a second negative electrode as a double-sided negative electrode are sequentially stacked or a structure in which a first negative electrode as a single-sided negative electrode, a separator, and a second positive electrode as a double-sided positive electrode are sequentially stacked, and each of the second full-cells is configured to have a structure in which a second negative electrode as a double-sided negative electrode, a separator, and a second positive electrode as a double-sided positive electrode are sequentially stacked or a structure in which a second positive electrode as a double-sided positive electrode, a separator, and a second negative electrode as a double-sided negative electrode are sequentially stacked.

6. The electrode assembly according to claim 1, wherein the electrode assembly comprises third bi-cells, disposed at the outermost sides of the electrode assembly, and fourth bi-cells disposed between the third bi-cells.

7. The electrode assembly according to claim 6, wherein each of the third bi-cells is configured to have a structure in which a first positive electrode as a single-sided positive electrode, a second negative electrode as a double-sided negative electrode, and a second positive electrode as a double-sided positive electrode are sequentially stacked in a state in which safety separators are disposed respectively therebetween or a structure in which a first negative electrode as a single-sided negative electrode, a second positive electrode as a double-sided positive electrode, and a second negative electrode as a double-sided negative electrode are sequentially stacked in a state in which safety separators are disposed respectively therebetween, and each of the fourth bi-cells is configured to have a structure in which a second negative electrode, a second positive electrode, and a second negative electrode are sequentially stacked in a state in which general separators are disposed respectively therebetween or a structure in which a second positive electrode, a second negative electrode, and a second positive electrode are sequentially stacked in a state in which general separators are disposed respectively therebetween.

8. The electrode assembly according to claim 1 wherein the unit cells are full-cells, the full-cells comprising third full-cells, disposed at the outermost sides of the electrode assembly, and fourth full-cells disposed between the third full-cells.

9. The electrode assembly according to claim 8, wherein each of the third full-cells is configured to have a structure in which a first positive electrode as a single-sided positive electrode, a safety separator, and a second negative electrode as a double-sided negative electrode are sequentially stacked or a structure in which a first negative electrode as a single-sided negative electrode, a safety separator, and a second positive electrode as a double-sided positive electrode are sequentially stacked, and each of the fourth full-cells is configured to have a structure in which a second negative electrode as a double-sided negative electrode, a general separator, and a second positive electrode as a double-sided positive electrode are sequentially stacked or a structure in which a second positive electrode as a double-sided positive electrode, a general separator, and a second negative electrode as a double-sided negative electrode are sequentially stacked.

10. The electrode assembly according to claim 1, wherein the elongation of the separation film and the safety separator is 105 to 500% of the elongation of the general separator.

11. The electrode assembly according to claim 10, wherein the elongation of the separation film and the safety separator is 120 to 300% of the elongation of the general separator.

12. The electrode assembly according to claim 1, wherein the separation film and the separator each are an organic/inorganic composite porous safety-reinforcing separator (SRS).

13. The electrode assembly according to claim 12, wherein the SRS separator is configured such that an active layer, comprising inorganic particles and a binder polymer, is coated on a polyolefin-based separator substrate.

14. The electrode assembly according to claim 13, wherein the inorganic particles are one or more kinds of inorganic particles selected from a group consisting of (a) inorganic particles having piezoelectricity and (b) inorganic particles having lithium ion transfer ability.

15. The electrode assembly according to claim 14, wherein the inorganic particles having piezoelectricity are one or more kinds of inorganic particles selected from a group consisting of $BaTiO_3$, $Pb(Zr,Ti)O_3$ (PZT), $Pb_{1-x}La_xZr_{1-y}Ti_yO_3$ (PLZT), $Pb(Mg_{1/3}Nb_{2/3})O_3$-$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, SiC, and a mixture thereof.

16. The electrode assembly according to claim 14, wherein the inorganic particles having lithium ion transfer ability are one or more kinds of inorganic particles selected from a group consisting of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), (LiAlTiP)$_xO_y$-based glass (where $0<x<4$ and $0<y<13$), lithium lanthanum titanate ($Li_xLa_yTiO_3$, where $0<x<2$ and $0<y<3$), lithium germanium thio phosphate ($Li_xGe_yP_zS_w$, where $0<x<4$, $0<y<1$, $0<z<1$, and $0<w<5$), lithium nitride ($Li_xN_y$, where $0<x<4$ and $0<y<2$), $SiS_2$-based glass ($Li_xSi_yS_z$, where $0<x<3$, $0<y<2$, and $0<z<4$), $P_2S_5$-based glass ($Li_xP_yS_z$, where $0<x<3$, $0<y<3$, and $0<z<7$), and a mixture thereof.

17. The electrode assembly according to claim 1, wherein the separation film and the safety separator each have a thickness of 16 to 30 micrometers and the general separator has a thickness of 10 to less than 16 micrometers.

18. The electrode assembly according to claim 17, wherein the separation film and the safety separator each have a thickness of 20 micrometers.

19. A secondary battery having an electrode assembly according to claim 1 mounted in a battery case.

20. The secondary battery according to claim 19, wherein the battery case is a pouch-shaped case made of an aluminum laminate sheet or a metal can-shaped case.

21. A battery pack comprising a secondary battery according to claim 19 as a unit battery.

22. A device comprising a battery pack according to claim 21 as a power source.

23. The device according to claim 22, wherein the device is selected from among a mobile phone, a portable computer, a smartphone, a smart pad, a tablet PC, and a netbook computer.

24. A stacked/folded type electrode assembly configured to have a structure in which two or more unit cells, each of which comprises a separator disposed between a positive electrode and a negative electrode, each having an electrode mixture comprising an electrode active material applied to a current collector, are wound using a sheet type separation film, wherein
the positive electrode is configured to have a structure in which a positive electrode mixture is coated on an aluminum foil as the current collector, and the negative electrode is configured to have a structure in which a negative electrode mixture is coated on a metal foil, other than the aluminum foil, as the current collector,
the unit cells comprise one or more full-cells and/or bi-cells,
one of the unit cells located at each outermost side of the electrode assembly is configured such that one outermost electrode of the unit cell is a single-sided electrode, the single-sided electrode being configured such that the electrode mixture is applied only to one major surface of the current collector facing the separator,
the separation film has higher elongation than the separator,
the one of the unit cells located at each outermost side of the electrode assembly is configured such that a separator facing the electrode mixture of the single-sided electrode is a safety separator,
the unit cells other than the one of the unit cells located at each outermost side of the electrode assembly is configured such that the separators are general separators,
the safety separator has higher elongation than the general separator, and
in the one of the unit cells located at each outermost side of the electrode assembly the electrode mixture of the single-sided electrode is located between the safety separator and the current collector.

* * * * *